United States Patent [19]

Chetwynd

[11] Patent Number: 5,014,169
[45] Date of Patent: May 7, 1991

[54] SUN VISOR

[75] Inventor: Howard L. Chetwynd, Atherstone, United Kingdom

[73] Assignee: Rover Group Limited, England

[21] Appl. No.: 543,457

[22] Filed: Jun. 26, 1990

[30] Foreign Application Priority Data

Jun. 28, 1989 [GB] United Kingdom ............... 8914824

[51] Int. Cl.$^5$ ............................................. F21V 33/00
[52] U.S. Cl. .................................. 362/142; 362/135; 362/136; 362/140; 362/141
[58] Field of Search ................. 362/142, 144, 74, 143, 362/135, 136, 80.1, 140, 141

[56] References Cited

U.S. PATENT DOCUMENTS

| 4,511,954 | 4/1985 | Marcus et al. | 362/74 |
| 4,648,011 | 3/1987 | Boote et al. | 362/144 |
| 4,652,982 | 3/1987 | Flowerday | 362/135 |
| 4,740,028 | 4/1988 | Connor | 362/142 |
| 4,760,503 | 7/1988 | Vandenberge et al. | 362/144 |
| 4,803,602 | 2/1989 | Svensson | 362/135 |
| 4,809,140 | 2/1989 | Jönsas | 362/142 |
| 4,858,082 | 8/1989 | Hayward | 362/74 |
| 4,912,607 | 3/1990 | Kocsi et al. | 362/80.1 |

Primary Examiner—Ira S. Lazarus
Assistant Examiner—Y. Quach
Attorney, Agent, or Firm—Davis, Bujold & Streck

[57] ABSTRACT

A sun visor for a motor vehicle is disclosed in which the sun visor (1) is movable from an in use position to a stored position. The sun visor (1) includes a vanity mirror (2) viewable when the sun visor (1) is in its in use position and illumination means (19) to selectively provide additional illumination of a user of the vanity mirror (2). The illumination means (19) is arranged to additionally supply illumination for the interior of the motor vehicle when the sun visor (1) is in its stowed position.

7 Claims, 3 Drawing Sheets

SUN VISOR

BACKGROUND TO THE INVENTION

This invention relates to a sun vizor and in particular to a sun vizor for a motor vehicle having an illuminated vanity mirror.

It is known from GB 1 575 086 to provide a sun vizor for a motor vehicle with an illuminated vanity mirror. The sun vizor is movable from an in use position in which the mirror is viewable to a stowed position in which the mirror is not visible.

It is an object of this invention to provide an improved sun vizor.

SUMMARY OF THE INVENTION

According to the invention there is provided a sun vizor for a motor vehicle in which the sun vizor is movable from an in use position to a stored position the sunvizor including a vanity mirror viewable when the sun vizor is in its in use position and illumination means to selectively provide additional illumination of a user of the vanity mirror wherein the illumination means is arranged to also selectively supply illumination for the interior of the motor vehicle at least when the sun vizor is in its stowed position.

Preferably, the illumination means may have a first lens on the same side of the sun vizor as the vanity mirror and a second lens on the opposite side of the sun vizor.

Preferably, the vanity mirror is slidable from a first position where it is viewable with the sun vizor in its in use position to a second position where it is concealed from view.

This has the advantage that when not required the mirror is moveable to a position where it is not a distraction with the sun vizor in its in use position.

Advantageously, when the vanity mirror is in its second position it is interposed between a source of illumination and the first lens thereby preventing light from the source of illumination reaching the first lens.

This has the advantage that unnecessary egress of light from the first lens is prevented when the vanity mirror is not in use Advantageously, the vanity mirror is carried by a frame a part of which forms a shutter for the second lens such that when the vanity mirror is in its first position the shutter is interposed between a source of illumination and the second lens thereoy preventing light from the source of illumination reaching the second lens.

This has the advantage that light is prevented from egress from the second lens when it is not required.

The source of illumination may be a light bulb.

BRIEF DESCRIPTION OF THE DRAWINGS

The invention will now be described by way of example with reference to the accompanying drawing of which.

DETAILED DESCRIPTION OF PREFERRED EMBODIMENT

Figure 1:
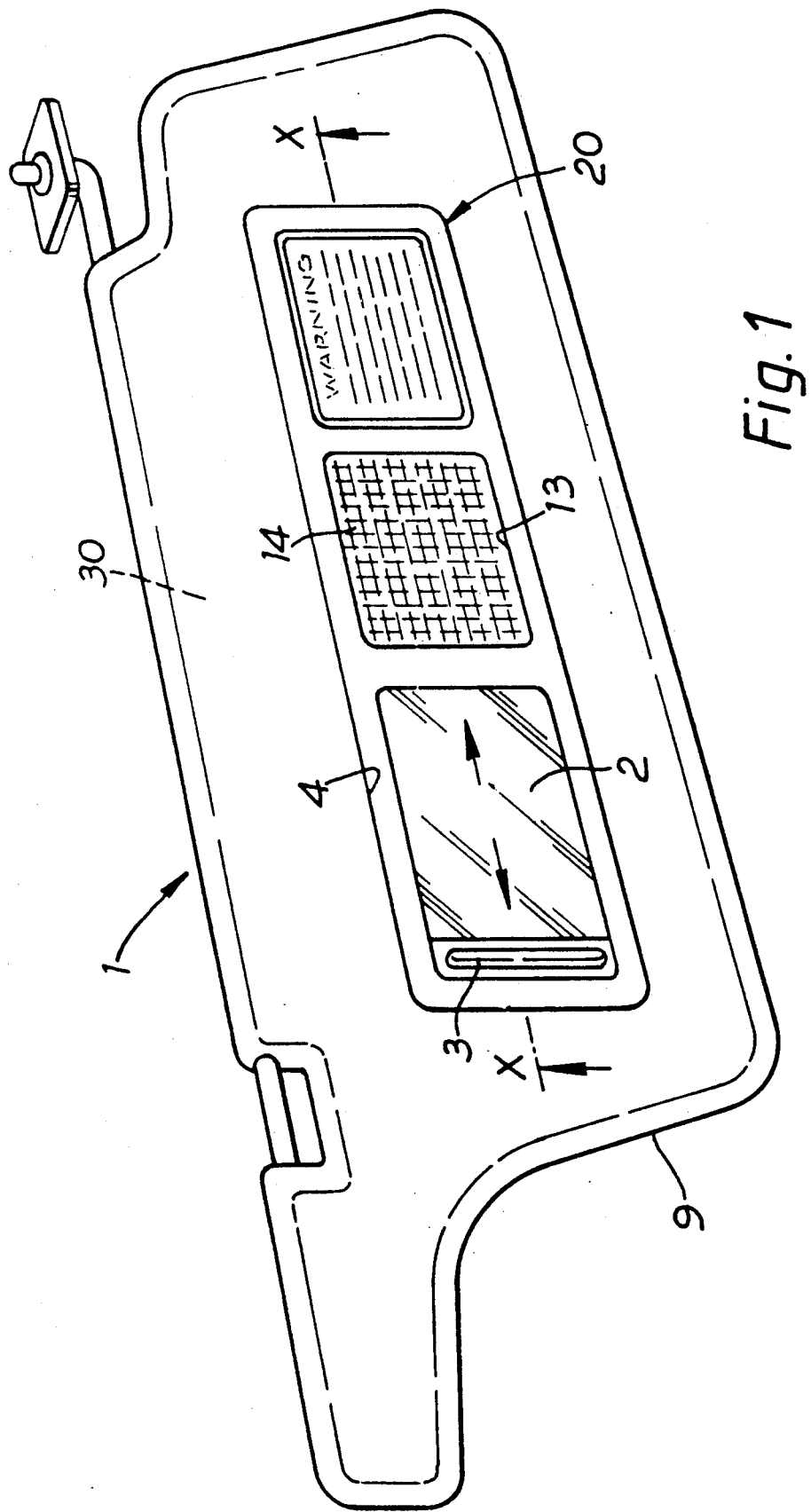
FIG. 1 is a pictorial representation of a sun vizor according to the invention.
Figure 2:
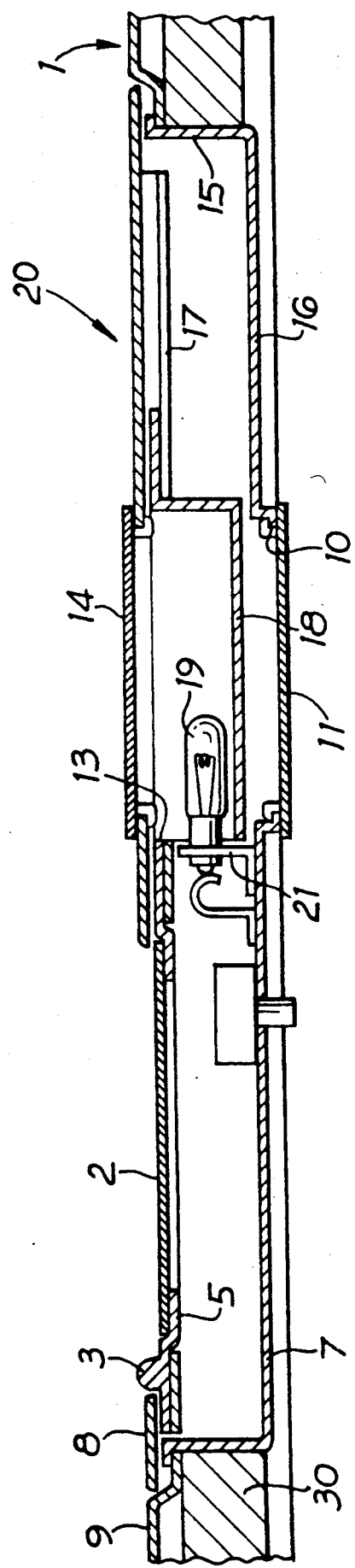
FIG. 2 is a partial cross-section along the line X—X on FIG. 1.
Figure 3:
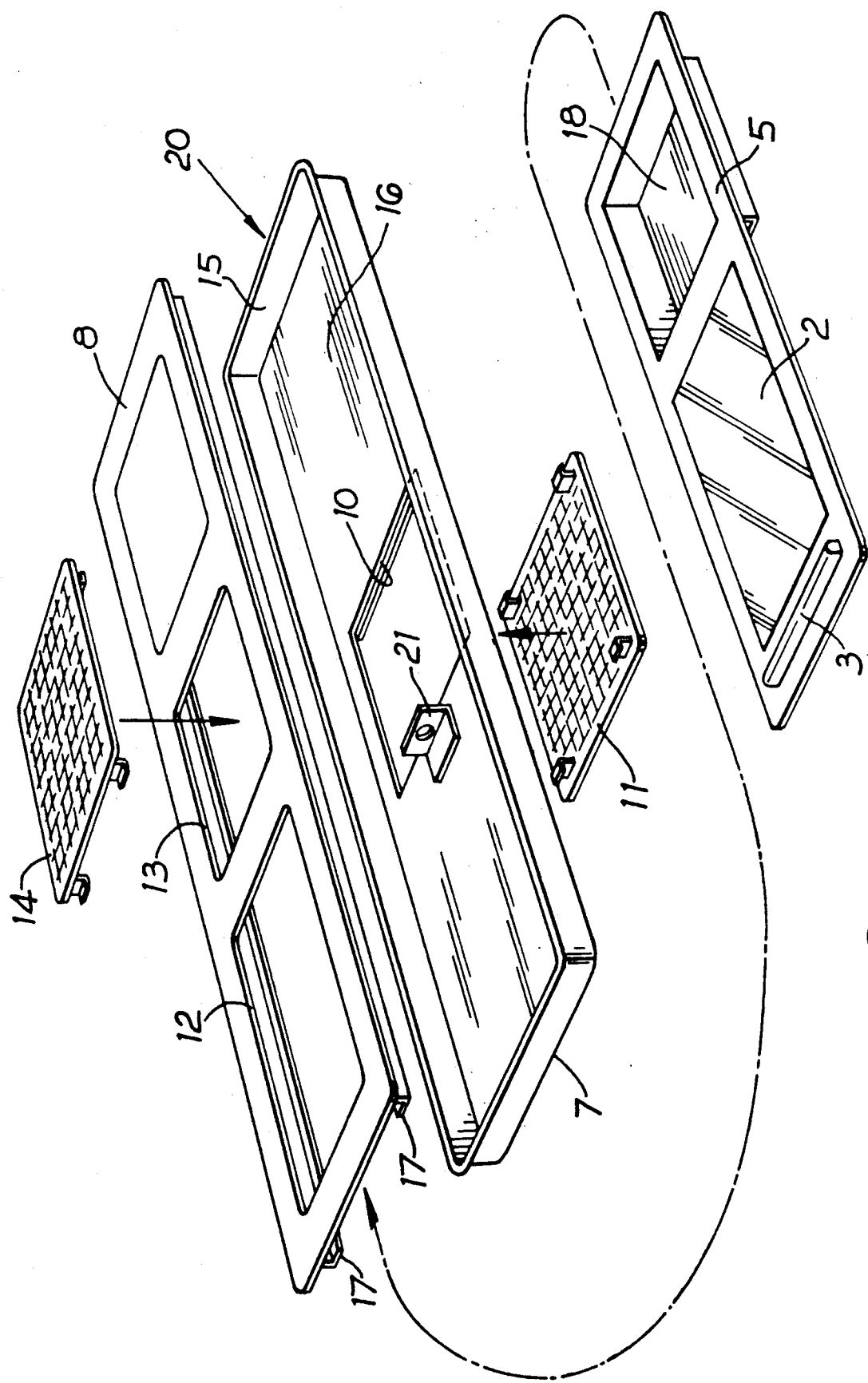
FIG. 3 is an exploded pictorial view of an illuminated mirror cassette forming part of the sun vizor according to the invention.

With reference to FIGS. 1-3 there is shown a sun vizor 1 having a molded frame 30 the outer surface of which is covered with a flexible trim material 9.

A mirror 2 is shown in FIGS. 1 and 2 in a viewing position where it may be viewed through an aperture 4 in the trim material 9.

The mirror 2 is slidable from the viewing position to a stowed position in which it is not visible by moving the mirror 2 to the right as shown in FIGS. 1 and 3.

The mirror 2 is bonded to the front face of a support frame 5 by means of an adhesive. Substantially the entire rear face of the mirror 2 is bonded to the frame 5 so that in the event of the mirror being fractured substantially all of the fragments will remain attached to the frame 5.

The frame 5 forms part of an illuminated mirror cassette assembly 20 and is molded from a plastics material, having a finger grip 3 formed on one end and a shutter 18 formed at the other end.

The cassette assembly 20 further comprises a base member 7 and a cover member 8 which are snap fitted together.

The base member 7 has a substantially flat central portion 16 the peripheral edge of which is turned up to form a boundary wall 15.

The flat portion 16 has an aperture 10 formed in it into which a lens 11 is fitted.

The cover member 8 has a first aperture 12 near one end and a second centrally placed aperture 13 into which a lens 14 is fitted and a pair of opposed L-shaped runners 17. The runners 17 are used to slidably support the frame 5 along its longitudinal edges.

A mounting for an illumination means in the form of a bulb 19 is provided by an L-shaped bracket 21 attached to the central portion 16 of the base member 7. Upon assembly of the base and cover members 7 and 8 the apertures 10 and 13 are aligned on either side of the bulb 19.

When the mirror 2 is in its viewing position as shown in FIG. 2 light from the bulb 19 can pass out the aperture 13 and lens 14 to illuminate the face of a person using the mirror 2 but light from the bulb 19 cannot pass through the aperture 10 and the lens 11 because it is blocked by the shutter 18.

When the mirror 2 is in its stored position the shutter 18 no longer prevents light from the bulb 19 from passing through the aperture 10 and the lens 11 but in this position light from the bulb 19 is prevented from passing through the aperture 13 and the lens 14 by the mirror 2 and its frame 5 which is interposed therebetween.

Such an arrangement has the advantage that it is possible to use one bulb to provide both additional illumination for a user of the vanity mirror 2 when the sun vizor is in its in use position with the mirror in use and as an interior light when the mirror 2 and the sun vizor are both in their stowed positions without producing unnecessary glare.

What is claimed:

1. A sun vizor for a motor vehicle in which the sun vizor is movable from an in use position to a stored position the sun vizor including a vanity mirror viewable when the sun vizor is in its in-use position and illumination means to selectively provide additional illumination of a user of the vanity mirror, wherein the illumination means is arranged also selectively to supply illumination for the interior of the motor vehicle at least when the sun vizor is in its stowed position.

2. A sun vizor as in claim 1 in which the illumination means has a first lens on the same side of the sun vizor as the vanity mirror and a second lens on the opposite side of the sun vizor.

3. A sun vizor as in claim 2 in which the vanity mirror is slidable from a first position where it is viewable with the sun vizor in its in use position to a second position where it is concealed from view.

4. A sun vizor as in claim 3 in which when the vanity mirror is in its second position it is interposed between a source of illumination and the first lens thereby preventing light from the source of illumination reaching the first lens.

5. A sun vizor as in claim 3 in which the vanity mirror is carried by a frame a part of which forms a shutter for the second lens such that when the vanity mirror is in its first position the shutter is interposed between a source of illumination and the second lens thereby preventing light from the source of illumination reaching the second lens.

6. A sun vizor as in claim 4 in which the source of illumination is a light bulb.

7. A sun vizor as in claim 5 in which the source of illumination is a light bulb.

* * * * *